(12) United States Patent
Yoshimura (10) Patent No.: US 10,567,881 B2
(45) Date of Patent: Feb. 18, 2020

(54) VIBRATOR AND ELASTIC COUPLING MEMBER FORMING SAME

(71) Applicant: Onkyo Corporation, Osaka (JP)

(72) Inventor: Hajime Yoshimura, Osaka (JP)

(73) Assignee: Onkyo Corporation, Osaka (JP)

( * ) Notice: Subject to any disclaimer, the term of this patent is extended or adjusted under 35 U.S.C. 154(b) by 0 days.

(21) Appl. No.: 16/212,776

(22) Filed: Dec. 7, 2018

(65) Prior Publication Data
US 2019/0182599 A1  Jun. 13, 2019

(30) Foreign Application Priority Data
Dec. 11, 2017 (JP) .................................. 2017-236657

(51) Int. Cl.
*H04R 9/04* (2006.01)
*H04R 9/02* (2006.01)
*H02K 33/18* (2006.01)
*H02K 41/035* (2006.01)

(52) U.S. Cl.
CPC ............. *H04R 9/046* (2013.01); *H02K 33/18* (2013.01); *H02K 41/0356* (2013.01); *H04R 9/025* (2013.01)

(58) Field of Classification Search
CPC ............................... H04R 9/025; H04R 9/027
USPC ......................................... 381/412–413, 420
See application file for complete search history.

(56) References Cited

U.S. PATENT DOCUMENTS

| 5,568,562 | A * | 10/1996 | Huang ..................... H04R 1/24 381/182 |
| 5,740,265 | A * | 4/1998 | Shirakawa ............. H04R 9/025 381/386 |
| 6,975,741 | B2 * | 12/2005 | Renner ................... H04R 9/045 381/407 |
| 2011/0207588 | A1 * | 8/2011 | Min ....................... H04R 11/02 482/142 |
| 2012/0033849 | A1 * | 2/2012 | Kang ..................... H04R 11/02 381/412 |

FOREIGN PATENT DOCUMENTS

| JP | S63-47398 B2 | 9/1998 |
| JP | 4080870 B2 | 2/2008 |

* cited by examiner

*Primary Examiner* — Suhan Ni
(74) *Attorney, Agent, or Firm* — Renner, Otto, Boisselle & Sklar, LLP (57) ABSTRACT

A vibrator includes a magnetic circuit having a magnetic gap, a voice coil having a coil arranged in the magnetic gap and a bobbin around which the coil is wound on one end side, a flange member coupled to the other end side of the bobbin protruding from the magnetic circuit, and an elastic coupling member coupling the magnetic circuit and the flange member so that the magnetic circuit and the flange member can vibrate relative to each other. The elastic coupling member includes a first fixed portion, a second fixed portion, and an elastic deformation portion coupling the first fixed portion and the second fixed portion via elastically-deformable coupling portions. The elastic coupling member is configured such that the first fixed portion, the second fixed portion, and the elastic deformation portion are integrally formed, and substantially houses the magnetic circuit, the voice coil, and the flange member inside.

11 Claims, 5 Drawing Sheets

VIBRATOR AND ELASTIC COUPLING MEMBER FORMING SAME

BACKGROUND OF THE INVENTION

1. Field of the Invention

The present invention relates to a vibrator configured to convert an electric audio signal into vibration and attached to an attachment target member to vibrate the attachment target member to transmit vibration or emit a sound wave. Specifically, the present invention relates to a vibrator configured to provide, even though the vibrator is small, great vibration and provide stable operation and an elastic coupling member forming the vibrator.

2. Description of the Related Art

A vibrator is attached to an attachment target member to vibrate the attachment target member, thereby emitting a sound wave. An electrodynamic vibrator includes, for converting an electric audio signal into vibration, a magnetic circuit having a magnetic gap where a voice coil is arranged. Typically, in a vibrator configured to vibrate a magnetic circuit including a magnet, the magnetic circuit supported by a damper reciprocates and vibrates in one given axial direction, thereby transmitting mechanical vibration via a frame. A voice coil in which current flows is, at one end thereof, fixed to the frame, and is arranged in a magnetic gap to generate drive force of vibration of the magnetic circuit.

In the electrodynamic vibrator as described above, the frame, the magnetic gap of the magnetic circuit, the voice coil, and the damper supporting a vibrator are, in many cases, in a circular shape and arranged concentrically. Concentric arrangement of these components is similar to that in the case of audio reproduction in an electrodynamic speaker. The damper is sometimes called a suspension. The frame is sometimes called a case or a coupler.

For example, Japanese Patent No. 4080870 discloses an inertial exciter for acoustic emission. The inertial exciter has a magnet assembly, a coupler attached to a surface of an acoustic emitter and movable relative to the magnet assembly, a voice coil assembly attached to the coupler, and a suspension attached to the coupler and the magnet assembly and configured to support the magnet assembly on the coupler in the vicinity of the voice coil assembly. The suspension is a cantilever-shaped flat arm member substantially arranged in a single plane passing through the center of gravity of the magnet assembly, and therefore, moment acting on the suspension is reduced.

The damper or the suspension of the vibrator is for center holding of the voice coil/magnetic circuit. For achieving balance between drive force and support force for a vibration system and increasing mechanical vibration to be generated without distortion or noise due to unbalance, an electrodynamic vibrator having a relatively-larger outer dimension than the diameter of a magnetic circuit is used. As a result, there is a problem that the entirety of the vibrator tends to be large as compared to the size of the magnetic circuit. On the other hand, a small vibrator has a problem that a magnetic circuit is relatively small, and as a result, vibration tends to be small.

Note that JP-B-63-47398 discloses that a damper of a flat speaker includes a freely-stretchable polygonal bellows body configured such that each surface is foldable.

SUMMARY OF THE INVENTION

The present invention has been made for solving the problems of the above-described typical techniques. An object of the present invention relates to a vibrator and an elastic coupling member forming the vibrator, and is to provide a vibrator configured such that the entirety of the vibrator is not large as compared to the size of a magnetic circuit and configured to provide, even though the vibrator is small, great vibration and provide stable operation.

The vibrator of the present invention includes a magnetic circuit having a magnetic gap, a voice coil having a coil arranged in the magnetic gap and a bobbin around which the coil is wound on one end side, a flange member coupled to the other end side of the bobbin protruding from the magnetic circuit, and an elastic coupling member coupling the magnetic circuit and the flange member so that the magnetic circuit and the flange member can vibrate relative to each other. The elastic coupling member includes a first fixed portion coupled to the magnetic circuit, a second fixed portion coupled to the flange member, and an elastic deformation portion coupling the first fixed portion and the second fixed portion via an elastically-deformable coupling portion. The elastic coupling member is configured such that the first fixed portion, the second fixed portion, and the elastic deformation portion are integrally formed, and substantially houses the magnetic circuit, the voice coil, and the flange member inside.

Preferably, in the vibrator of the present invention, the elastic coupling member is formed such that multiple integrated members of the first fixed portion, the second fixed portion, and the elastic deformation portion are coupled to each other.

Preferably, in the vibrator of the present invention, the first fixed portion, the second fixed portion, and the coupling portion of the elastic deformation portion in the elastic coupling member are formed to have a substantially identical outer dimension.

Preferably, in the vibrator of the present invention, the elastic deformation portion of the elastic coupling member is formed such that multiple coupling portions are arranged in an annular shape, and defines, between adjacent ones of the coupling portions, a hole through which air can pass along a second direction substantially perpendicular to a first direction in which the magnetic circuit and the flange member vibrate relative to each other.

Preferably, the vibrator of the present invention further includes a dustproof member formed from a member exhibiting air permeability and dust resistance and covering the hole defined by the elastic deformation portion of the elastic coupling member.

Preferably, in the vibrator of the present invention, the first fixed portion, the second fixed portion, and the elastic deformation portion of the elastic coupling member are formed to include an identical material.

Preferably, in the vibrator of the present invention, the first fixed portion and the second fixed portion of the elastic coupling member are formed to include a material different from that forming the elastic deformation portion.

Preferably, in the vibrator of the present invention, the elastic coupling member is formed in a substantially annular shape or a substantially U-shape in such a manner that a base formed in a strip shape is rolled up, and is formed in the substantially annular shape or the substantially U-shape in such a manner that one end and the other end of the first fixed portion are moved close to each other and one end and the other end of the second fixed portion are moved close to each other.

Preferably, in the vibrator of the present invention, the elastic coupling member has multiple cutouts on at least one surface side of the first fixed portion and the second fixed portion of the base formed in the strip shape, and is formed in the substantially annular shape or the substantially U-shape in such a manner that inclined surfaces defining each cutout come close to each other to curve the base.

Preferably, in the vibrator of the present invention, the elastic deformation portion of the elastic coupling member is formed such that multiple coupling portions are arranged in an annular shape, and each cutout is formed at a corresponding position between adjacent ones of the coupling portions.

Preferably, the elastic coupling member of the present invention forms any of the above-described vibrators.

Hereinafter, features of the present invention will be described.

The vibrator of the present invention includes the magnetic circuit having the magnetic gap, the voice coil having the coil arranged in the magnetic gap and the bobbin around which the coil is wound on one end side, the flange member coupled to the other end side of the bobbin protruding from the magnetic circuit, and the elastic coupling member coupling the magnetic circuit and the flange member so that the magnetic circuit and the flange member can vibrate relative to each other. The elastic coupling member includes the first fixed portion coupled to the magnetic circuit, the second fixed portion coupled to the flange member, and the elastic deformation portion coupling the first fixed portion and the second fixed portion via the elastically-deformable coupling portion. The elastic coupling member is configured such that the first fixed portion, the second fixed portion, and the elastic deformation portion are integrally formed, and substantially houses the magnetic circuit, the voice coil, and the flange member inside. More preferably, the first fixed portion, the second fixed portion, and the coupling portion of the elastic deformation portion in the elastic coupling member are formed to have the substantially same outer dimension.

Housing is a term meaning housing in a certain location, and indicates that a body as a subject houses a target as an object inside a certain shape dimension. Thus, the elastic deformation portion of the present invention substantially houses the magnetic circuit, the voice coil, and the flange member inside. Thus, a housing used in the typical vibrator can be omitted. The elastic coupling member substantially housing the magnetic circuit and the like inside defines the entire size of the vibrator, and therefore, the size of the magnetic circuit housed inside as compared to the entire size of the vibrator can be relatively larger than that in the typical case. As a result, the vibrator configured to provide great vibration even though the vibrator is small can be implemented. The elastic coupling member may be formed such that multiple integrated members of the first fixed portion, the second fixed portion, and the elastic deformation portion are coupled to each other.

In the elastic coupling member of the vibrator, the elastic deformation portion is formed such that the multiple coupling portions are arranged in the annular shape, and defines, between adjacent ones of the coupling portions, the hole through which air can pass along the second direction substantially perpendicular to the first direction in which the magnetic circuit and the flange member vibrate relative to each other. Thus, by changing the configuration of the coupling portion stretchable in the first direction and the configuration of the hole opening in the second direction, hardness/softness of the elastic deformation portion can be adjusted, and compliance as the damper for center holding in the second direction can be adjusted. In the case of further providing the dustproof member covering the hole defined by the elastic deformation portion of the elastic coupling member, entrance of dust and the like into the magnetic gap of the magnetic circuit can be prevented.

In the elastic coupling member, the first fixed portion, the second fixed portion, and the elastic deformation portion formed integrally are formed to include the same material. The first fixed portion and the second fixed portion of the elastic coupling member may be formed to include the material different from that forming the elastic deformation portion. The number of components such as screws for fixing the elastic coupling member is reduced. Thus, there are advantages that a cost for a manufacturing step is reduced and a quality is stabilized.

The elastic coupling member may be formed in the substantially annular shape or the substantially U-shape in such a manner that the base formed in the strip shape is rolled up. In this case, the elastic coupling member can be formed in the substantially annular shape or the substantially U-shape in such a manner that one end and the other end of the first fixed portion are moved close to each other and one end and the other end of the second fixed portion are moved close to each other. In the case of forming the elastic coupling member in the substantially annular shape or the substantially U-shape, the multiple cutouts may be formed on at least one surface side of the first fixed portion and the second fixed portion of the base formed in the strip shape, and the base may be curved in such a manner that the inclined surfaces defining each cutout come close to each other. In a case where the elastic deformation portion is formed such that the multiple coupling portions are arranged in the annular shape, each cutout is preferably formed at the corresponding position between adjacent ones of the coupling portions.

According to the vibrator of the present invention and the elastic coupling member forming the vibrator, the vibrator configured such that the entirety of the vibrator is not large as compared to the size of the magnetic circuit can be formed, and the vibrator configured to provide, even though the vibrator is small, great vibration and provide stable operation can be implemented.

DETAILED DESCRIPTION OF THE PREFERRED EMBODIMENTS

Hereinafter, a vibrator according to preferred embodiments of the present invention and an elastic coupling member forming the vibrator will be described, but the present invention is not limited to these embodiments.

First Embodiment

Figure 1:
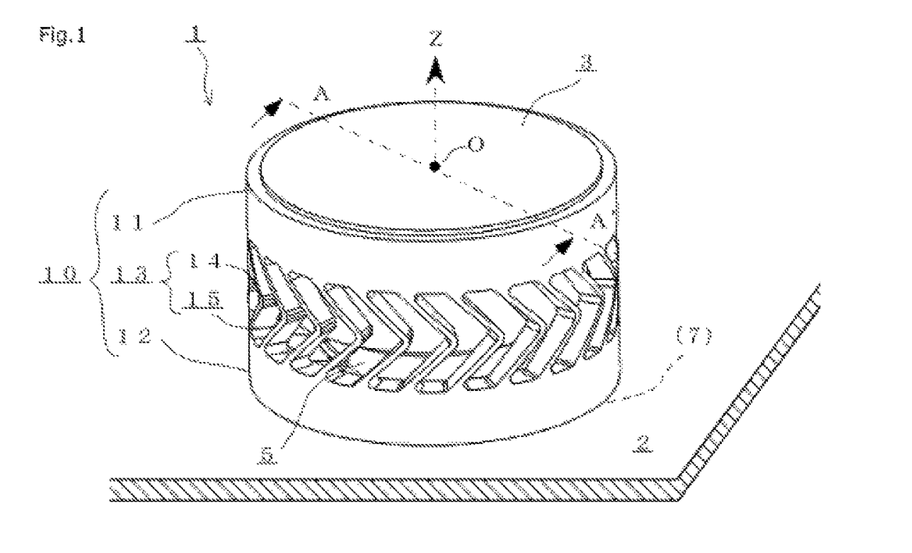
FIG. 1 is a view for describing a vibrator according to a preferred embodiment of the present invention.
Figure 2:
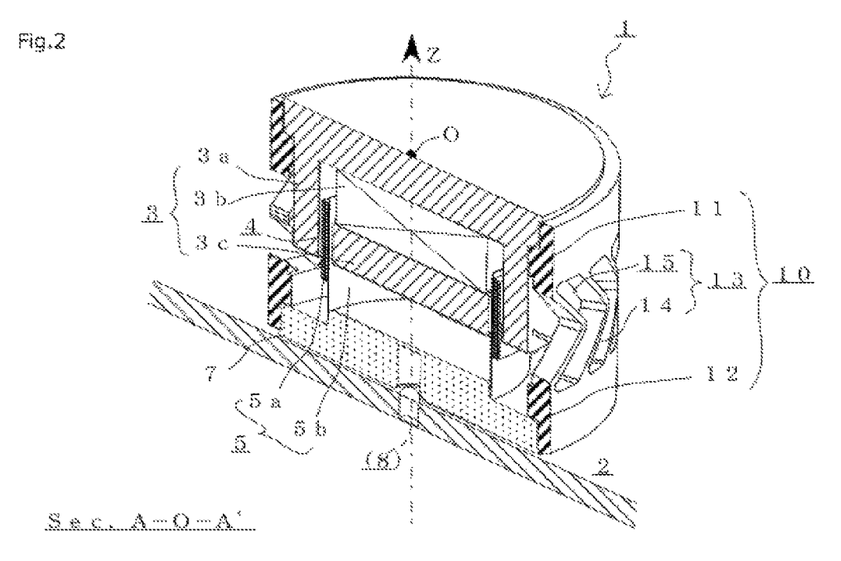
FIG. 2 is a view for describing an internal structure of the vibrator according to the preferred embodiment of the present invention.

FIGS. 1 and 2 are views for describing a vibrator 1 according to a preferred embodiment of the present invention. Specifically, FIG. 1 is a perspective view of the vibrator 1 attached to a flat plate 2 as an attachment target member. Moreover, FIG. 2 is a sectional view of an internal structure of the vibrator 1 in an A-O-A' section of FIG. 1. Note that a partial configuration unnecessary for description of the present invention will not be shown in the figures, and will not be described. Needless to say, the form of the vibrator 1 is not limited to that in the case of the present embodiment.

The vibrator 1 of the present embodiment is an electrodynamic vibrator having a substantially cylindrical entire shape and including a relatively-small internal magnet type magnetic circuit 3. The vibrator 1 is attached to the flat plate 2 to vibrate the flat plate 2, thereby emitting a sound wave. The vibrator 1 to which audio signal current is input generates drive force changing in an AC manner along a Z-direction passing through an illustrated center point O, thereby vibrating the flat plate 2. The vibrator 1 is attached to the flat plate 2 via a flange member 7 on a bottom side of the vibrator 1.

The internal magnet type magnetic circuit 3 includes a yoke 3a, a magnet 3b, and a pole 3c. The magnetic circuit 3 of the vibrator 1 has, for converting an input electric audio signal into vibration, a magnetic gap 4 where a voice coil 5 is arranged. The annular magnetic gap 4 is defined between an outer peripheral surface of the discoid pole 3c and an inner peripheral surface of the recessed yoke 3a, and a strong DC magnetic field is generated by magnetic force from the magnet 3b.

The voice coil 5 includes a coil 5a arranged in the magnetic gap 4 of the magnetic circuit 3, and a bobbin 5b around which the coil 5a is wound on one end side. The other end side of the bobbin 5b of the voice coil 5 is attached to the flange member 7. For example, the flange member 7 formed from a non-magnetic member such as resin is, by a (not-shown) screw, screwed into a screw hole 8 as a through-hole provided at the flat plate 2. Note that a (not-shown) terminal connected to a (not-shown) coil wire drawn from the coil 5a of the voice coil 5 is provided at the flange member 7, and the audio signal current is input to the flange member 7.

The vibrator 1 includes an elastic coupling member 10 coupling the magnetic circuit 3 and the flange member 7 so that the magnetic circuit 3 and the flange member 7 can vibrate relative to each other. In the vibrator 1 of the present embodiment, the voice coil 5 and the flange member 7 are fixed unmovably relative to the flat plate 2, and therefore, the drive force generated at the coil 5a arranged in the magnetic gap 4 of the magnetic circuit 3 vibrates to relatively displace the magnetic circuit 3. The elastic coupling member 10 couples the magnetic circuit 3 and the flange member 7 so that the magnetic circuit 3 and the flange member 7 can vibrate relative to each other, and therefore, the magnetic circuit 3 can vibrate. The magnetic circuit 3 includes the yoke 3a and the pole 3c as magnetic materials, and the magnet 3b. Thus, the magnetic circuit 3 has a relatively-great weight. Consequently, as the magnetic circuit 3 vibrates, reactive force against the drive force acts to vibrate the flat plate 2.

The elastic coupling member 10 includes a first fixed portion 11 coupled to the magnetic circuit 3, a second fixed portion 12 coupled to the flange member 7, and an elastic deformation portion 13 coupling the first fixed portion 11 and the second fixed portion 12 via elastically-deformable coupling portions 14. The elastic deformation portion 13 of the elastic coupling member 10 is formed such that the multiple coupling portions 14 in such a shape that each coupling portion 14 bends in a substantially "doglegged" shape along the illustrated Z-direction and has a predetermined thickness in a radial direction are arranged in an annular shape. An upper end side of each substantially "doglegged" shaped coupling portion 14 is coupled to the first fixed portion 11, and a lower end side of each coupling portion 14 is coupled to the second fixed portion 12.

Thus, the elastic deformation portion 13 defines, between adjacent ones of the coupling portions 14, a hole 15 having such a substantially "doglegged" shaped section that air can pass along the radial direction (a second direction) substantially perpendicular to the Z-direction (a first direction) in which the magnetic circuit 3 and the flange member 7 vibrate relative to each other. In FIGS. 1 and 2, the state of the magnetic gap 4 of the magnetic circuit 3 can be viewed through the holes 15 of the elastic deformation portion 13 of the elastic coupling member 10, the voice coil 5 being arranged in the magnetic gap 4 inside the elastic coupling member 10.

The elastic coupling member 10 of the present embodiment is configured such that the first fixed portion 11, the second fixed portion 12, and the elastic deformation portion 13 are integrally formed from the same acrylic resin material. Each coupling portion 14 of the elastic deformation portion 13 having a relatively-thin section slightly deforms such that a portion bending with respect to the illustrated Z-direction bends. Thus, the drive force generated at the coil 5a arranged in the magnetic gap 4 of the magnetic circuit 3 can vibrate the magnetic circuit 3 and the flange member 7 relative to each other.

The elastic deformation portion 13 of the elastic coupling member 10 is not limited to the configuration with the substantially "doglegged" shaped coupling portions 14 and holes 15. By changing the configuration of each coupling portion 14 stretchable in the Z-direction and the configuration of each hole 15 opening in the radial direction, hardness/softness of the elastic deformation portion 13 of the elastic coupling member 10 can be adjusted, and stiffness/compliance as a damper for center holding in the radial direction can be adjusted. The elastic coupling member 10 is configured such that the elastic deformation portion 13 is made of a resin material with a greater loss than, e.g., that of a metal material, and therefore, there is an advantage that the value of a resonant frequency Q at the resonant frequency f0 of the vibrator 1 can be moderately suppressed low.

Moreover, in the elastic coupling member 10, the first fixed portion 11, the second fixed portion 12, and the coupling portions 14 of the elastic deformation portion 13 are formed to have the substantially same outer dimension. As a result, the elastic coupling member 10 defines the entire size of the vibrator 1 in the radial direction, and substantially houses the magnetic circuit 3, the voice coil 5, and the flange member 7 inside. Each coupling portion 14 of the elastic coupling member 10 is in the substantially "doglegged" shape along the Z-direction as described above, and the center bending portion is in a shape not protruding to inner and outer diameter sides of the annular shape. Thus, the size of the magnetic circuit 3 housed inside as compared to the entire size of the vibrator 1 can be relatively larger than that of a typical case.

If the elastic coupling member 10 is a substantially flat plate-shaped member such as a damper or a suspension of a typical technique and is in a shape with a second fixed portion having an extremely-smaller inner diameter dimension than an outer diameter dimension defining a first fixed portion, the size of the magnetic circuit 3 housed inside is relatively smaller even when the same outer diameter dimension is employed. In this case, the drive force to be generated is lower due to the smaller magnetic circuit 3. Further, the weight of the magnetic circuit 3 tends to be small, and vibration to be generated for the flat plate 2 tends to be small.

On the other hand, the elastic coupling member 10 of the present embodiment is configured such that each coupling portion 14 of the elastic deformation portion 13 is in a shape with less protrusion in an inner diameter direction, and is configured to substantially house the magnetic circuit 3, the voice coil 5, and the flange member 7 inside. Thus, the elastic coupling member 10 defines the entire size of the vibrator 1. Consequently, in the vibrator 1, the size of the magnetic circuit 3 housed inside the elastic coupling member 10 as compared to the entire size of the vibrator 1 can be relatively larger than that in the typical case. As a result, the vibrator 1 which can provide great vibration even though the vibrator 1 is small can be implemented.

Use of the elastic coupling member 10 can eliminate a housing defining an outer shell used in a typical vibrator, and therefore, the vibrator 1 can be downsized. The elastic coupling member 10 is configured such that the first fixed portion 11, the second fixed portion 12, and the elastic deformation portion 13 are integrally formed from the same resin material, and therefore, the number of components such as screws for fixing the elastic coupling member 10 to the magnetic circuit 3 or the flange member 7 can be reduced. As a result, there are advantages that a cost for the step of manufacturing the vibrator 1 is reduced and a quality is stabilized.

Note that in the vibrator 1 of the present embodiment, each of the magnetic circuit 3 and the flange member 7 is exposed on an end side in the Z-direction as a vibration direction so that the magnetic circuit 3 and the flange member 7 can be attached and fixed to the flat plate 2, for example. Note that regarding the radial direction substantially perpendicular to the Z-direction, the elastic coupling member 10 substantially houses the magnetic circuit 3, the voice coil 5, and the flange member 7 inside. This is because the elastic coupling member 10 is configured such that the first fixed portion 11 coupled to the magnetic circuit 3, the second fixed portion 12 coupled to the flange member 7, and the elastic deformation portion 13 are integrally formed. As described above, the elastic coupling member 10 may be configured such that the first fixed portion 11, the second fixed portion 12, and the elastic deformation portion 13 are integrally formed, and may substantially house the magnetic circuit 3, the voice coil 5, and the flange member 7 inside.

The elastic coupling member 10 may be configured such that the first fixed portion 11, the second fixed portion 12, and the elastic deformation portion 13 are integrally formed, and may be formed such that multiple integrated members of the first fixed portion 11, the second fixed portion 12, and the elastic deformation portion 13 are coupled to each other in a circumferential direction. For example, the substantially cylindrical elastic coupling member 10 may include two members divided into two halves along an A-A' section, and the substantially half (180 degrees) in the circumferential direction and the remaining substantially half (180 degrees) in the circumferential direction may be coupled to each other.

In FIGS. 1 and 2, in the vibrator 1 of the present embodiment, the holes 15 of the elastic deformation portion 13 of the elastic coupling member 10 are exposed so that the holes 15 can be directly viewed from the outside. Note that the vibrator 1 may further include a (not-shown) dustproof member formed from a member exhibiting air permeability and dust resistance and covering the holes 15 defined by the elastic deformation portion 13 of the elastic coupling member 10. The dustproof member can prevent dust or the like from entering the magnetic gap 4 of the magnetic circuit 3. As a result, a failure such as occurrence of noise upon vibration of the vibrator 1 can be prevented. The dustproof member may be a net, woven fabric, or a non-woven fabric formed from soft fibers, and may close the holes 15 of the elastic deformation portion 13 of the elastic coupling member 10 to cover the holes 15 from the outside or cover the holes 15 from the inside.

Second Embodiment

Figure 3A:
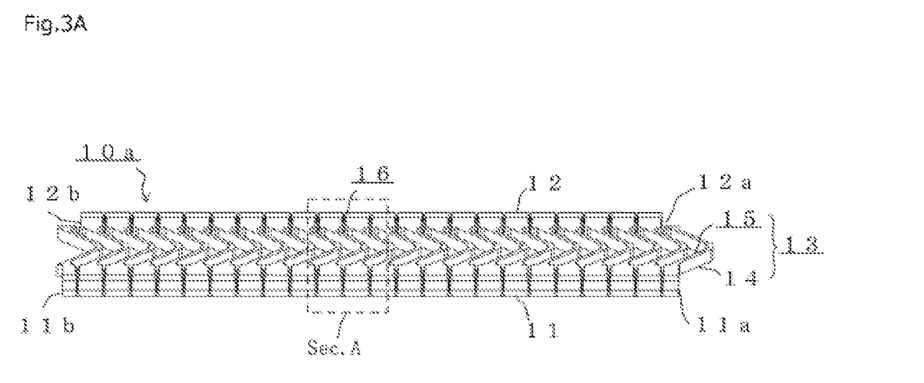
FIGS. 3A and 3B are views for describing an elastic coupling member of a vibrator according to another preferred embodiment of the present invention.
Figure 3B:
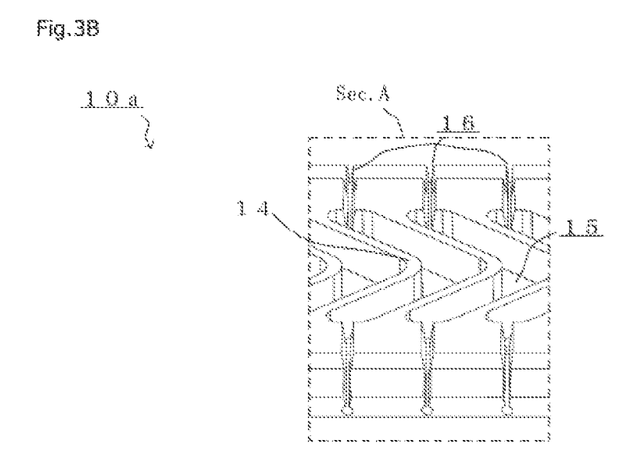

FIGS. 3A and 3B are views for describing an elastic coupling member 10a according to another preferred embodiment of the present invention. Specifically, FIG. 3A is a perspective view of the elastic coupling member 10a opening up in a planar shape, FIG. 3B is a perspective view being provided with a partial enlarged view. Note that as in the case of the above-described embodiment, a partial configuration unnecessary for description of the present invention will not be shown in the figure, and will not be described. Needless to say, the forms of a vibrator 1a and the elastic coupling member 10a are not limited to those in the case of the present embodiment.

The elastic coupling member 10a of the present embodiment is an elastic coupling member usable instead of the elastic coupling member 10 of the vibrator 1 in the case of the above-described embodiment. In the case of incorporating the elastic coupling member 10a into the vibrator 1, the elastic coupling member 10a is a member in the substantially same cylindrical shape as that of the elastic coupling member 10 in the case of the above-described embodiment. That is, FIGS. 3A and 3B illustrate the elastic coupling member 10a opening up in the planar shape at a stage before incorporation into the vibrator 1.

The elastic coupling member 10a can be formed in a substantially annular shape in such a manner that a base formed in a strip shape as illustrated in FIG. 3A is rolled up. The elastic coupling member 10a can be formed in the substantially annular shape in such a manner that one end 11a and the other end 11b of a first fixed portion 11 of the elastic coupling member 10a are moved close to each other and one end 12a and the other end 12b of a second fixed portion 12 of the elastic coupling member 10a are moved close to each other. This is because multiple cutouts 16 including opposing inclined surfaces are provided on at least one surface side of the first fixed portion 11 and the second fixed portion 12 of the base formed in the strip shape. In the present embodiment, each cutout 16 is, at the first fixed portion 11 and the second fixed portion 12, provided corresponding to the position of a hole 15 between adjacent ones of coupling portions 14.

In the elastic coupling member 10a of the present embodiment, the strip-shaped base can be curved and formed into the annular shape in such a manner that the inclined surfaces defining each cutout 16 come close to each other. That is, this is because when the cutouts 16 are arranged on an inner diameter side of the first fixed portion 11 and the second fixed portion 12 formed in the substantially annular shape and the inclined surfaces defining each cutout 16 come close to each other, an inner-diameter-side peripheral length becomes relatively shorter than an outer-diameter-side peripheral length, and accordingly, the strip-shaped base is curved. Needless to say, the cutouts 16 may be arranged on an outer diameter side of the first fixed portion 11 and the second fixed portion 12 formed in the substantially annular shape. In this case, the inclined surfaces defining each cutout 16 do not come close to each other, but each cutout 16 deforms to open further. Thus, the strip-shaped base can be curved and formed into the annular shape.

In the elastic coupling member 10a, the first fixed portion 11, the second fixed portion 12, and the elastic deformation portion 13 formed integrally are formed to include the same resin material. Further, the first fixed portion 11 and the second fixed portion 12 are formed to include a material different from that forming the elastic deformation portion 13. Specifically, a film material as the material different from the resin material is insert-molded into the first fixed portion 11 and the second fixed portion 12 provided with the cutouts 16, and the first fixed portion 11 and the second fixed portion 12 exhibit higher stiffness than that of the elastic deformation portion 13 including no film material.

In the elastic coupling member 10a, when the film material is arranged at a thin portion to which the cutouts 16 do not extend such that the film material is not exposed through the cutouts 16, there are advantages that a probability that the first fixed portion 11 and the second fixed portion 12 are broken from any of the cutouts 16 is low, durability is enhanced, and a quality is stabilized. Needless to say, the first fixed portion 11 and the second fixed portion 12 may include, regardless of the presence or absence of the cutouts 16, other materials than the film material to enhance the stiffness. Depending on the depth/shape of the cutout 16, the first fixed portion 11 and the second fixed portion 12 do not necessarily include the material different from that forming the elastic deformation portion 13.

In the elastic coupling member 10a including the resin material, the strip-shaped base as illustrated in FIG. 3A is rolled up and formed into the substantially annular shape, and therefore, there are advantages that the film material can be insert-molded into the linear first and second fixed portions 11, 12 and manufacturing is facilitated. Moreover, for defining the multiple coupling portions 14 and each hole 15 between adjacent ones of the coupling portions 14, injection molding with a die or cutting with a punching die is allowed, for example. There is an advantage that manufacturing of the elastic coupling member 10a is facilitated.

Note that the elastic coupling member 10a may be formed into the substantially annular shape or a substantially U-shape in such a manner that one end 11a and the other end 11b of the first fixed portion 11 are moved close to each other and one end 12a and the other end 12b of the second fixed portion 12 are moved close to each other. One end (11a, 12a) and the other end (11b, 12b) are not necessarily directly coupled to each other, and the elastic coupling member 10a may be formed into the substantially annular shape or the substantially U-shape in such a manner that one end (11a, 12a) and the other end (11b, 12b) are coupled via other members with these ends being close to each other. In a case where the elastic coupling member 10a is made of a soft material and the first fixed portion 11 and the second fixed portion 12 can be sufficiently curved, the cutouts 16 are not necessarily provided. Needless to say, the elastic coupling member 10a may be formed in such a manner that multiple integrated members of the first fixed portion 11, the second fixed portion 12, and the elastic deformation portion 13 are coupled to each other.

Even in a case where a voice coil 5 and a magnetic circuit 3 are in a non-circular shape including no circular magnetic gap as in the above-described embodiment, such as an oval shape or a track shape, the elastic coupling member 10, 10a may be formed in the substantially annular shape or the substantially U-shape corresponding to the outer shapes of the voice coil 5 and the magnetic circuit 3.

Third Embodiment

Figure 4:
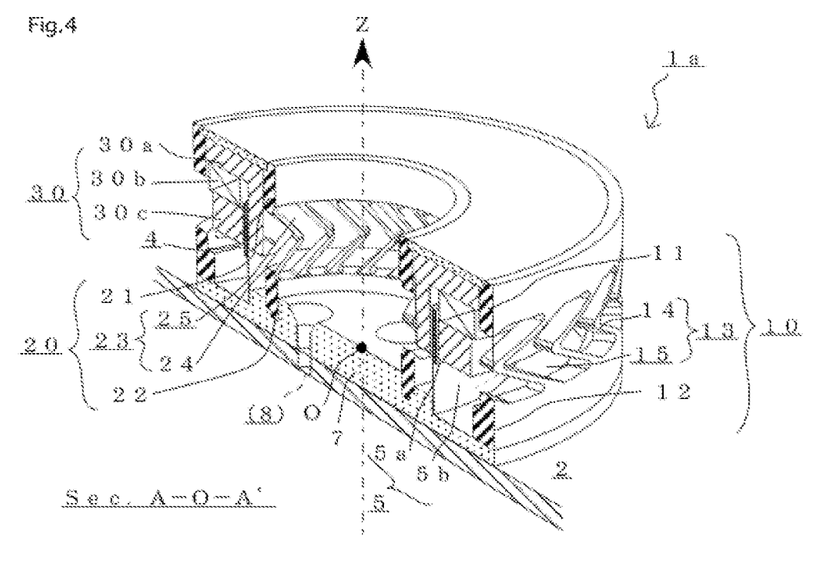
FIG. 4 is a view for describing a vibrator according to still another preferred embodiment of the present invention.

FIG. 4 is a view for describing a vibrator 1a according to still another preferred embodiment of the present invention. Specifically, FIG. 4 is a sectional view of an internal structure of the vibrator 1a attached to a flat plate 2 as an attachment target member in an A-O-A' section. Note that as in the cases of the above-described embodiments, the same reference numerals are used to represent a partial configuration unnecessary for description of the present invention, and such a configuration will not be shown in the figure and will not be described. Needless to say, the forms of the vibrator 1a and elastic coupling members 10, 20 are not limited to those in the case of the present embodiment.

The vibrator 1a of the present embodiment is an electrodynamic vibrator having a substantially cylindrical entire shape and including a larger voice coil 5 and a larger external magnet type magnetic circuit 30 as compared to the cases of the prior embodiments. The vibrator 1a is configured such that the elastic coupling member 20 is further provided on an inner peripheral side of the magnetic circuit 30 in addition to the elastic coupling member 10 provided on an outer peripheral side of the magnetic circuit 30. The vibrator 1a is attached to the flat plate 2 to vibrate the flat plate 2, thereby emitting a sound wave. The vibrator 1a to which audio signal current is input generates drive force changing in an AC manner along a Z-direction passing through an illustrated center point O, thereby vibrating the flat plate 2. Attachment of the vibrator 1a to the flat plate 2 via a flange member 7 on a bottom side of the vibrator 1a is similar to that in the prior embodiments.

The external magnet type magnetic circuit 30 includes a pole 30a, a magnet 30b, and a plate 30c. The magnetic circuit 30 of the vibrator 1a has, for converting an input electric audio signal into vibration, a magnetic gap 4 where the voice coil 5 is arranged. The annular magnetic gap 4 is defined between an outer peripheral surface of a raised tip end portion of the pole 30a and an inner peripheral surface of the annular plate 30c, and a strong DC magnetic field is generated by magnetic force from the magnet 30b. A through-hole through which a Z-axis passes is provided at a center pole of the pole 30a, and therefore, the flange member 7 is exposed to a magnetic circuit 30 side through the through-hole.

The vibrator 1a includes the elastic coupling member 10 coupling the magnetic circuit 30 and the flange member 7 on the outer peripheral side and the elastic coupling member 20 coupling the magnetic circuit 30 and the flange member 7 on the inner peripheral side, so that the magnetic circuit 30 and the flange member 7 can vibrate relative to each other. In the vibrator 1a of the present embodiment, the voice coil 5 and the flange member 7 are fixed unmovably relative to the flat plate 2, and therefore, the drive force generated at a coil 5a arranged in the magnetic gap 4 of the magnetic circuit 30 vibrates the magnetic circuit 30 to relatively displace the magnetic circuit 30. The elastic coupling members 10, 20 couple the magnetic circuit 30 and the flange member 7 so that the magnetic circuit 30 and the flange member 7 can vibrate relative to each other, and therefore, the magnetic circuit 30 can vibrate. The magnetic circuit 30 includes the pole 30a and the plate 30c as magnetic materials and the magnet 30b, and therefore, has a relatively-great weight. Thus, as the magnetic circuit 30 vibrates, reactive force against the drive force acts to vibrate the flat plate 2.

The elastic coupling member 10 has a material and a configuration similar to those of the elastic coupling member 10 of the prior embodiments. Moreover, the elastic coupling member 20 has a material and a configuration similar to those of the elastic coupling member 10 of the prior embodiments, except that the elastic coupling member 20 is arranged in the through-hole of the pole 30a on the inner peripheral side of the magnetic circuit 30.

That is, the elastic coupling member 20 includes a first fixed portion 21 coupled to the magnetic circuit 30, a second fixed portion 22 coupled to the flange member 7, and an elastic deformation portion 23 coupling the first fixed portion 21 and the second fixed portion 22 via elastically-deformable coupling portions 24. The elastic deformation portion 23 of the elastic coupling member 20 is formed such that the multiple coupling portions 24 in such a shape that each coupling portion 24 bends in a substantially "doglegged" shape along the illustrated Z-direction and has a predetermined thickness in a radial direction are arranged in an annular shape. An upper end side of each substantially "doglegged" shaped coupling portion 24 is coupled to the first fixed portion 21, and a lower end side of each coupling portion 24 is coupled to the second fixed portion 22. Thus, the elastic deformation portion 23 defines, between adjacent ones of the coupling portions 24, a hole 25 having such a substantially "doglegged" shaped section that air can pass along a radial direction (a second direction) substantially perpendicular to the Z-direction (a first direction) in which the magnetic circuit 30 and the flange member 7 vibrate relative to each other.

The elastic coupling member 20 is configured such that the first fixed portion 21, the second fixed portion 22, and the elastic deformation portion 23 are integrally made of the same resin material. Each coupling portion 24 of the elastic deformation portion 23 having a relatively-thin section slightly deforms such that a portion bending with respect to the illustrated Z-direction bends. Thus, the drive force generated at the coil 5a arranged in the magnetic gap 4 of the magnetic circuit 30 can vibrate the magnetic circuit 30 and the flange member 7 relative to each other.

In the elastic coupling member 10 on the outer peripheral side, the first fixed portion 11, the second fixed portion 12, and coupling portions 14 of the elastic deformation portion 13 are formed to have the substantially same outer dimension. Moreover, in the elastic coupling member 20 on the inner peripheral side, the first fixed portion 21, the second fixed portion 22, and the coupling portions 24 of the elastic deformation portion 23 are formed to have the substantially same inner dimension. As a result, the elastic coupling members 10, 20 substantially house the magnetic circuit 30, the voice coil 5, and the flange member 7 inside a space defined by the elastic coupling members 10, 20.

Thus, in the vibrator 1a, the size of the magnetic circuit 30 housed inside the elastic coupling members 10, 20 as compared to the entire size of the vibrator 1a can be relatively larger than that in a typical case. Moreover, even when the size and weight of the magnetic circuit 30 increase, the elastic coupling members 10, 20 support, from the outer and inner peripheral sides, the magnetic circuit 30 on the flange member 7, and therefore, there is an advantage that operation is stabilized. Further, the flange member 7 is exposed to the magnetic circuit 30 side via the through-hole of the pole 30a, and therefore, the vibrator 1a can be attached to the flat plate 2 with a (not-shown) screw from the side of the through-hole. Note that the vibrator 1a includes the elastic coupling member 10 and the elastic coupling member 20, but in some cases, may include only the elastic coupling member 20 on the inner peripheral side.

The elastic coupling member 20 may be configured such that the first fixed portion 21, the second fixed portion 22, and the elastic deformation portion 23 are integrally formed, and may be formed such that multiple integrated members of the first fixed portion 21, the second fixed portion 22, and the elastic deformation portion 23 are coupled to each other in a circumferential direction. For example, the substantially cylindrical elastic coupling member 20 may include two members divided into two halves along an A-A' section, and the substantially half (180 degrees) in the circumferential direction and the remaining substantially half (180 degrees) in the circumferential direction may be coupled to each other. Moreover, the elastic coupling member 20 may be also formed in a substantially annular shape in such a manner that a base formed in a strip shape as in the prior embodiment is rolled up.

Moreover, for the elastic coupling member 10 and the elastic coupling member 20, a resin material such as polypropylene (PP), ABS, polyurethane, epoxy, polyester, or LCP may be used in addition to a resin material similar to that of the prior embodiments. For example, the elastic coupling member 10 may be formed by so-called double molding such that the first fixed portion 11 and the second fixed portion 12 are made of a solid resin material exhibiting high hardness and the elastic deformation portion 13 coupling the first fixed portion 11 and the second fixed portion 12 is made of a soft resin material exhibiting relatively-low hardness.

Further, the elastic coupling member 10 and the elastic coupling member 20 are in the substantially cylindrical shape as in the prior embodiments, but may be in a rectangular parallelepiped sectional shape such as a rectangular shape. The shapes of the elastic coupling member 10 and the elastic coupling member 20 are not limited.

The vibrator of the present invention is not limited to one including the internal magnet type magnetic circuit 3 or the external magnet type magnetic circuit 30 as in the above-described embodiments, and may be a vibrator including, e.g., a repulsive magnetic circuit. Moreover, the vibrator of the present invention is not limited to one attached to the flat plate 2 as the attachment target member to reproduce audio, and may be a vibrator configured to apply vibration to an attachment target. Further, the elastic coupling member can be also used as a damper of an electrodynamic speaker.

What is claimed is:

1. A vibrator comprising:
   a magnetic circuit having a magnetic gap;
   a voice coil having a coil arranged in the magnetic gap and a bobbin around which the coil is wound on one end side;
   a flange member coupled to the other end side of the bobbin protruding from the magnetic circuit; and
   an elastic coupling member coupling the magnetic circuit and the flange member so that the magnetic circuit and the flange member can vibrate relative to each other,
   wherein the elastic coupling member
      includes a first fixed portion coupled to the magnetic circuit, a second fixed portion coupled to the flange member, and an elastic deformation portion coupling the first fixed portion and the second fixed portion via an elastically-deformable coupling portion,
      is configured such that the first fixed portion, the second fixed portion, and the elastic deformation portion are integrally formed, and substantially houses the magnetic circuit, the voice coil, and the flange member inside.

2. The vibrator according to claim 1, wherein the elastic coupling member is formed such that multiple integrated members of the first fixed portion, the second fixed portion, and the elastic deformation portion are coupled to each other.

3. The vibrator according to claim 1, wherein the first fixed portion, the second fixed portion, and the coupling portion of the elastic deformation portion in the elastic coupling member are formed to have a substantially identical outer dimension.

4. The vibrator according to claim 1, wherein the elastic deformation portion of the elastic coupling member is formed such that multiple coupling portions are arranged in an annular shape, and defines, between adjacent ones of the coupling portions, a hole through which air can pass along a second direction substantially perpendicular to a first direction in which the magnetic circuit and the flange member vibrate relative to each other.

5. The vibrator according to claim 4, further comprising:
a dustproof member formed from a member exhibiting air permeability and dust resistance and covering the hole defined by the elastic deformation portion of the elastic coupling member.

6. The vibrator according to claim 1, wherein the first fixed portion, the second fixed portion, and the elastic deformation portion of the elastic coupling member are formed to include an identical material.

7. The vibrator according to claim 1, wherein the first fixed portion and the second fixed portion of the elastic coupling member are formed to include a material different from that forming the elastic deformation portion.

8. The vibrator according to claim 1, wherein the elastic coupling member is formed in a substantially annular shape or a substantially U-shape in such a manner that a base formed in a strip shape is rolled up, and is formed in the substantially annular shape or the substantially U-shape in such a manner that one end and the other end of the first fixed portion are moved close to each other and one end and the other end of the second fixed portion are moved close to each other.

9. The vibrator according to claim 8, wherein the elastic coupling member has multiple cutouts on at least one surface side of the first fixed portion and the second fixed portion of the base formed in the strip shape, and is formed in the substantially annular shape or the substantially U-shape in such a manner that inclined surfaces defining each cutout come close to each other to curve the base.

10. The vibrator according to claim 9, wherein the elastic deformation portion of the elastic coupling member is formed such that multiple coupling portions are arranged in an annular shape, and each cutout is formed at a corresponding position between adjacent ones of the coupling portions.

11. An elastic coupling member forming the vibrator according to claim 1.

* * * * *